(No Model.)
A. DELAMATER.
COMBINED ANTI RATTLER AND SHAFT SUPPORT.
No. 377,605. Patented Feb. 7, 1888.
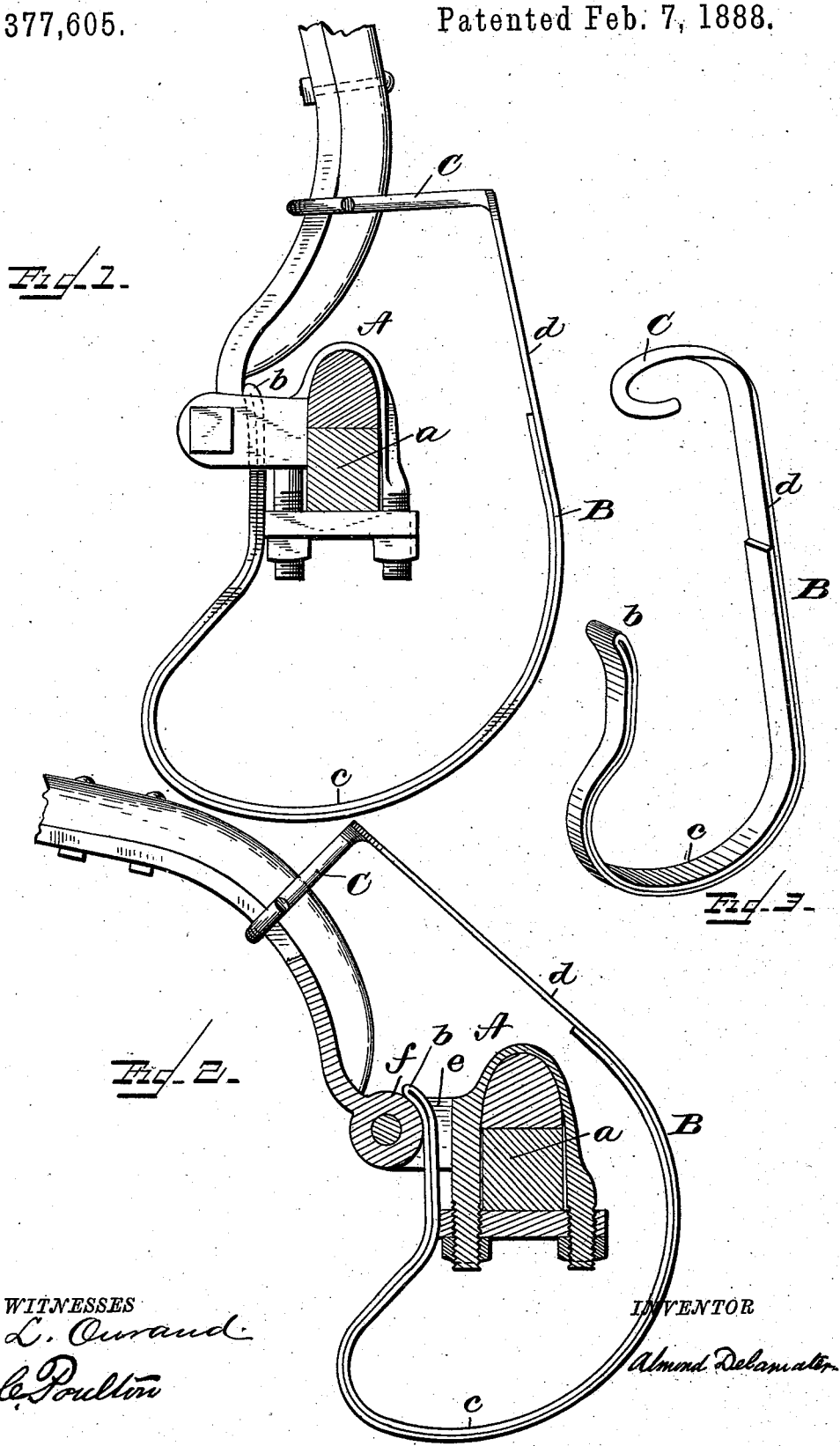
WITNESSES
F. L. Ourand
Geo. Poulton
INVENTOR
Almond Delamater

UNITED STATES PATENT OFFICE.

ALMOND DELAMATER, OF MEADVILLE, PENNSYLVANIA.

COMBINED ANTI-RATTLER AND SHAFT-SUPPORT.

SPECIFICATION forming part of Letters Patent No. 377,605, dated February 7, 1888.

Application filed August 18, 1887. Serial No. 247,248. (No model.)

*To all whom it may concern:*

Be it known that I, ALMOND DELAMATER, a citizen of the United States, residing at Meadville, in the county of Crawford and State of Pennsylvania, have invented certain new and useful Improvements in a Combined Shaft-Balance and Anti-Rattler, of which the following is a description.

This invention has relation to improvements in a combined shaft-balance and anti-rattler for the shafts of vehicles; and it consists in the novel construction and arrangement of parts, as will be hereinafter described, and particularly pointed out in the claims.

In the accompanying drawings, Figure 1 is a side view with the shaft in its raised position. Fig. 2 is a side view, partly in section, with the shaft lowered. Fig. 3 is a perspective view of the spring or support.

Referring to the drawings, the letter A designates the thill-coupling, secured to the axle a in the usual well-known manner.

B designates my improved spring, bent, as shown at b, to form a curve, for a purpose to be presently explained. By doubling that portion of the spring upon itself, as shown, another leaf is added to it at that point where the greatest strain comes upon it without the trouble and expense of riveting or welding it to the main portion. It is further bent in U-shaped form, as at c, and has a vertical portion, d, the upper portion of which terminates in a hook end, C.

The operation of my invention is as follows: The curved end b of the spring B is inserted in the recess e of the thill-coupling, and fits snugly on the bearing or coupling end of the shaft f, as shown in Fig. 2. The vertical portion d is then pressed inward, so that the hook end C will be connected with the shaft, said shaft being held in an upright position, as shown in Fig. 1. In attaching the animal to the shafts they are drawn down into the position as shown in Fig. 2. When the animal is detached from the shafts, they will resume their position automatically, as shown in Fig. 1.

I attach importance to the simple construction and arrangement of my improvement, the same being made of one piece of metal, preferably doubled upon itself and bent, as above described. I also attach importance to the construction of the curved end b, which is seated in the recess of the thill-coupling and has its bearing on the coupling end of the shaft, whereby the bolt is prevented from rattling.

I wish it to be understood that I do not confine myself to the construction shown in my drawings and described in my specification, as I may use a different form of spring to produce the same result without departing from my invention and the true spirit and scope thereof.

Having described my invention and the operation thereof, what I claim, and desire to secure by Letters Patent, is—

1. A shaft balance or support consisting of a spring doubled upon itself and bent as shown, and having at its upper portion a hook end, the whole made in one piece, as shown and described.

2. A shaft balance or support consisting of a spring bent at b to form a curve, and also provided with a U-shaped bend, c, vertical portion d, and hook end C, as shown and described.

3. In a shaft balance or support, the combination, with the thill-coupling having the recess e, of the spring B, having curve b, bend c, vertical portion d, and hook end C, said curve b adapted to engage the recess, and the said hook end C engaging the shafts, whereby the said shafts are supported in a vertical position, all constructed and arranged to operate as shown and described.

ALMOND DELAMATER.

Witnesses:
GEO. C. POULTON,
FRANCK L. OURAND.